Jan. 6, 1942.   R. R. CURTIS   2,268,806
BY-PASS VALVE FOR AIRCRAFT FUEL PUMPS
Original Filed July 13, 1939
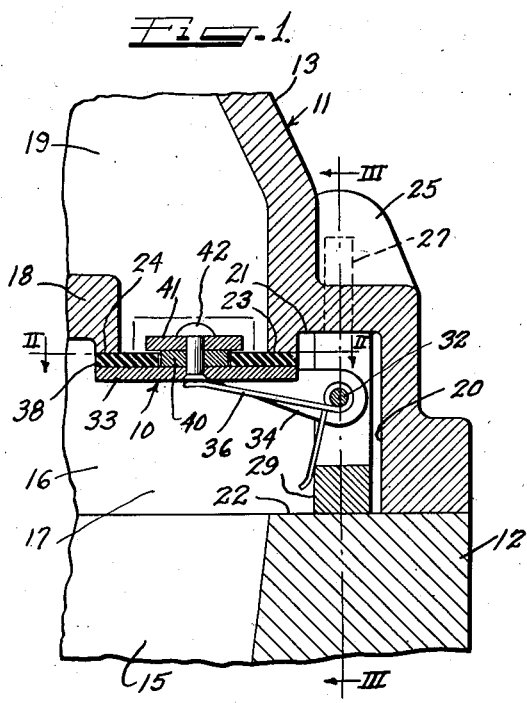
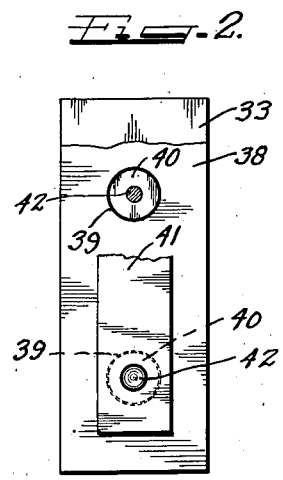
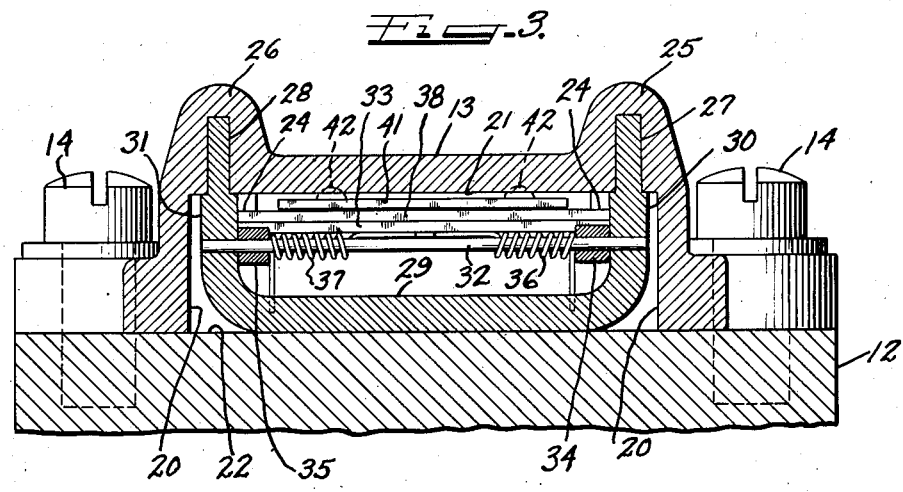
Inventor
RUSSELL R. CURTIS.
by Charles Hall
Attys.

Patented Jan. 6, 1942

2,268,806

UNITED STATES PATENT OFFICE 2,268,806

BY-PASS VALVE FOR AIRCRAFT FUEL PUMPS

Russell R. Curtis, Dayton, Ohio, assignor to Curtis Pump Company, Dayton, Ohio, a corporation of Ohio Original application July 13, 1939, Serial No. 284,263. Divided and this application March 15, 1940, Serial No. 324,103

6 Claims. (Cl. 251—125)

The present invention, a division of my co-pending application entitled "Aircraft fuel pump," filed July 13, 1939, Serial No. 284,263, relates to fuel pumps for aircraft engines and is more particularly directed to mechanism for permitting the by-passing of fuel from the suction to the discharge side of the pump.

Aircraft fuel systems of the class to which this invention pertains includes a by-pass valve through which fuel may be forced from the suction to the discharge side of the power pump by means of an auxiliary hand operated pump, the hand pump being available in an emergency when for any reason the power pump fails to deliver the fuel, and it is an object of this invention to provide a more simple and effective by-pass valve which will occupy less space than those heretofore known.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawing, in which:

Figure 1 is a fragmentary vertical cross-sectional view, with parts in elevation, illustrating the connection and operative relation of a by-pass valve in a fuel pump body in accordance with the principles of the present invention;

Figure 2 is a reduced plan view, with parts broken away, of the by-pass valve illustrated in Figure 1 as seen in the plane taken substantially along the line II—II of Figure 1; and Figure 3 is a fragmentary vertical cross-sectional view, with parts in elevation, as seen when taken along the line III—III of Figure 1.

The valve construction 10 of the present invention is illustrated in Figure 1 as being assembled in a construction 11 having hollow body members 12 and 13. In the present instance, the construction 11 is a pump assembly having the removably connected hollow housing portions 12 and 13. It is to be understood, however, that the valve 10 may be applied to any mechanism for the purpose of controlling the flow of fluid therethrough.

As best shown in Figure 3, the housing or body portions 12 and 13 are removably connected together by means of studs, 14. When so connected, the fluid flow duct 15 in the housing portion 12 and the fluid flow duct 16 in the housing portion 13 open into each other to define a discharge chamber 17.

A web or hub 18, in the body portion 13, divides the body into the flow duct 16 and a suction chamber 19. Fluid flow between the chambers is normally restricted by the by-pass valve 10 whose operative connection to the pump will now be described.

The pump body portion 13 is chambered as at 20 to provide a surface 21 in spaced relation from the connecting surface 22 of the pump body portion 12. The chamber surface 21 terminates on the inside of the pump body portion 13 in a downwardly extending rib which defines a valve seat 23. Likewise, the web or hub 18 terminates in a downwardly extending rib portion defining a valve seat 24 in horizontal alignment with the seat 23.

As best shown in Figure 3, the chambered portion of the pump body 13 has upwardly extending bosses 25 and 26 at the ends of the chamber 20. Holes are formed in the bosses 25 and 26 for receiving round end portions 27 and 28 of a U-shaped frame 29. It is to be noted that the legs 30 and 31 of the U-shaped frame 29 are as long as the distance between the pump body surfaces 21 and 22. The bottom of the frame 29 rests on the connecting surface 22 whereby the frame is held securely in place as long as the pump body portions 12 and 13 are assembled but may be readily removed for repairs when the body portions are separated.

A hinge pin 32 bridges the space between the frame legs 30 and 31 and has its end portions embedded therein.

A by-pass valve is usually incorporated in a power pump of an aircraft fuel system, so that in the event of partial or total failure of the pump, fuel may be forced through the power pump, independently of its pumping elements, by means of a auxiliary pump provided for that purpose.

Heretofore, by-pass valve constructions, particularly those used in pumps in aircraft fuel systems, have been made with a metal to metal seal, necessitating considerable initial spring pressure to hold them closed when not operating. Furthermore, these valve constructions have not been so placed as to provide the greatest possible freedom in the passages through them, and, consequently, considerable auxiliary pump pressure was required to overcome these innate resistances.

The by-pass valve 10 of this invention is of improved design. It is of synthetic rubber to metal seal construction, so that a very light spring holds it closed effectively against leakage, and is so placed with its orifices so shaped as to provide a substantially direct non-resisting passage for the flow of pumped fuel.

As best shown in Figures 1 and 2, the by-pass valve 10 comprises a rectangular metal flap 33 having hinge ears 34 and 35 extending angularly away therefrom and being swingably supported in the valve frame 29 by the hinge pin 32. Torque springs 36 and 37, surrounding the hinge pin 32, have free ends which engage the frame and flap and are so tensioned as to urge the flap to a normal closed position.

A facing pad 38 of resilient material, preferably a compound of cork and synthetic rubber, is secured to the flap 33. In order to provide against any distortion in the facing pad and to allow for swelling inherent in the material thereof, the pad is provided with spaced apart holes 39 into which the spacing washers 40 fit freely. It is to be noted that the washers 40 are slightly smaller in diameter than the holes 39 in the facing pad and are thicker than the facing pad for a purpose now to be explained.

A retaining plate 41 lies on the washers 40 and is sized for completely covering the washers but is smaller than the facing pad to provide an exposed portion of the pad around the marginal edge of the by-pass valve in order that the resilient pad might fully seat on the valve seats 23 and 24. Rivets 42, 42 extend through the metal flap 33, the washers 40, 40 and the retaining plate 41 to secure the parts together.

The washers 40, 40 are enough thicker than the facing pad 38 and enough smaller in diameter than the holes 39, 39 to allow for swelling inherent in the material of the facing pad to provide against any distortion thereof when subjected to fluids flowing between the pump chambers 19 and 17. By eliminating any distortion, the facing pad 38 will be held in sealing engagement against the valve seats 23 and 24 by the springs 36 and 37 exerting pressure against the pivoted flap 33.

As long as the fluid pressure within the chamber 19 is less than the pressure of the springs 36 and 37, the valve 10 will remain seated against the valve seats 23 and 24. When the pressure in the chamber 19 exceeds the pressure of the springs 36 and 37, such as when fuel is pumped through the pump chambers by an auxiliary pump, the valve mechanism will pivot on the hinge pin 32 away from the seats 23 and 24 to permit fluid flow from the chamber 19 into the discharge chamber 17.

It will be apparent from the foregoing that a simple by-pass valve construction is provided by this invention wherein a sealing material is held against a valve seat with no distortion therein even though the material swells when subjected to flow of certain fluids past the valve.

While a particular embodiment only of this invention has been illustrated, it will, of course, be understood that the invention should not be limited thereto, since many modifications may be made, and therefore, it is contemplated by the appended claims to cover all such modifications as fall within the true spirit and scope of the present invention.

What I claim is:

1. A valve construction for engagement with a seat separating fluid chambers comprising, a valve flap adapted to swing toward and away from said seat, a resilient facing on said flap having spaced holes therethrough, washers in said holes of smaller diameter than said holes but thicker than said facing, a plate resting on the top of said washers, rivets extending through the plate, washers and flap securing the same together, hinge ears on said flap, a supporting hinge frame, a hinge pin passing through said supporting frame and said ears, and resilient means normally urging said valve to a closed position on said seat.

2. In a construction having hollow bodies arranged for removable connection to each other, one of said bodies having a wall separating said bodies into chambers, and an apertured portion in said wall defining a valve seat, a check valve in said one body comprising a valve flap adapted to swing toward and away from said seat, a resilient facing held loosely on said flap, hinge ears on said flap, a hinge frame having pins extending upwardly therefrom and slidable in holes in said one body, the lower surface of said frame resting on a portion of the surface of said other body to which said one body is connected whereby said frame is securely held while the bodies are assembled but readily removable when they are separated, a hinge pin extending through said frame and said ears for pivotally supporting said valve, and resilient means for normally urging said valve to a closed position on said seat.

3. A valve construction arranged for movement toward and away from a seat comprising a pivoted flap, a resilient facing pad on said flap and having a row of holes therethrough, a washer in each of said holes being of greater thickness than said facing pad and of less diameter than the hole within which it is positioned, a plate covering said holes and covering a portion only of said facing pad resting on the top of said washers, and means extending through said holes for connecting said plate, washers and flap together.

4. The combination with removably connected wall portions having flat engaging surfaces, one of said wall portions having a recess defining a surface spaced from said engaging surface on the other wall portion, and spaced holes in said one wall portion terminating in said recess surface, of a valve supporting frame comprising a U-shaped member having a flat bight portion arranged to be seated on the flat surface of the other wall portion, a pair of pins on the free ends of the legs of said U-shaped member and slidably seated within the holes of the one wall portion, a pin bridging and having its ends embedded within the legs of said U-shaped member for pivotally supporting a valve, and a spring member having an intermediate portion coiled around said pin and its end portions extending radially from the pin in angular relation to each other, one of the end portions of said spring abutting the bight portion of said frame and the other end portion engaging a valve for urging it in one direction.

5. The combination with a pair of removably connected hollow bodies having flat engaging surfaces at their connected ends, a sidewall of one of said bodies being recessed at its connected end to define a surface in spaced relation from the engaging surface on the other body, a wall in said one body separating said bodies into chambers, and an apertured portion in said wall defining a valve seat, of a check valve comprising a flap, hinge ears on said flap, a resilient facing on said flap and having spaced holes therethrough, a washer for each of said holes being of greater thickness than said facing and of less diameter than the facing hole in which it is seated, a plate entirely covering said holes and covering a portion only of said facing resting on top of said washers, rivets extending through the plate, washers and flap securing them together, a U-shaped supporting member having a flat bight portion seated on the engaging surface of said other body, pins on the free ends of the legs of said U-shaped member and slidably seated within holes in the sidewall of said one body, a pin bridging and having its ends embedded within the legs of said U-shaped member, said pin passing through the hinge ears on said flap for pivotally supporting said valve, and a spring adjacent each hinge ear having an intermediate portion coiled around said pin and its end portions extending radially from the pin in angular relation to each other, one of said end portions abutting the bight portion of said U-shaped member and the other end portion engaging said valve flap for normally urging the valve against the valve seat.

6. A frame for pivotally supporting a valve having apertured mounting arms extending therefrom, comprising a U-shaped member having the free ends of the legs thereof arranged for mounting in a support, a pin bridging and having its ends carried by the legs of said U-shaped member, said pin passing through the apertured mounting arms of said valve for pivotally supporting the latter, and spring means intermediately connected to said pin and having end portions extending radially from the pin, one of said end portions abutting the bight portion of the U-shaped member and the other of said end portions engaging said valve for normally urging the latter in one direction.

RUSSELL R. CURTIS.